United States Patent [19]
Manoogian et al.

[11] 3,747,638
[45] July 24, 1973

[54] SINGLE HANDLE MIXING VALVE

[75] Inventors: Alex Manoogian, Grosse Pointe Farms; Eric V. Pullen, Northville, both of Mich.

[73] Assignee: Masco Corporation, Taylor, Mich.

[22] Filed: Aug. 25, 1971

[21] Appl. No.: 174,665

[52] U.S. Cl. .......................................... 137/625.4
[51] Int. Cl. ............................................. F16k 11/00
[58] Field of Search.................. 137/625.4, 625.41, 137/625.42, 636.3, 636.2

[56] References Cited
UNITED STATES PATENTS

| | | | |
|---|---|---|---|
| 3,254,669 | 6/1966 | Perlman | 137/636.3 X |
| 3,266,523 | 8/1966 | Stevens | 137/636.3 |
| 3,372,710 | 3/1968 | Millet | 137/636.3 |
| 3,506,036 | 4/1970 | Hare | 137/636.3 |
| 3,698,418 | 10/1972 | Schmitt | 137/636.3 X |
| 2,601,966 | 7/1952 | Busick | 137/625.42 X |
| 3,023,784 | 3/1962 | Monson | 137/625.41 X |
| 3,384,119 | 5/1968 | Manoogian | 137/625.4 X |
| 3,415,281 | 12/1968 | Perlman | 137/625.4 |
| 3,476,149 | 11/1969 | Dornaus | 137/625.4 |
| 3,512,547 | 5/1970 | Gibbs et al. | 137/625.4 X |
| 3,526,250 | 9/1970 | Miller | 137/625.4 |
| 3,533,436 | 10/1970 | Parkison | 137/625.4 X |
| 3,667,503 | 6/1972 | Farrell et al. | 137/625.4 |

*Primary Examiner*—Samuel Scott
*Attorney*—L. Gaylord Hulbert, Charles R. McKinley et al.

[57] ABSTRACT

A single handle mixing valve in which a disc type valve member is slidable over the hot and cold water inlet ports in a valve body by movement of a single operating handle. A control means including a cam element is interposed between the handle and the disc valve so that forward and back movement of the handle in a vertical plane effects linear movement of the disc valve in one direction to control the volume of flow, and rotation of the handle on its axis effects linear movement of the disc valve in a perpendicular direction to control the mixture of the two liquids.

7 Claims, 5 Drawing Figures

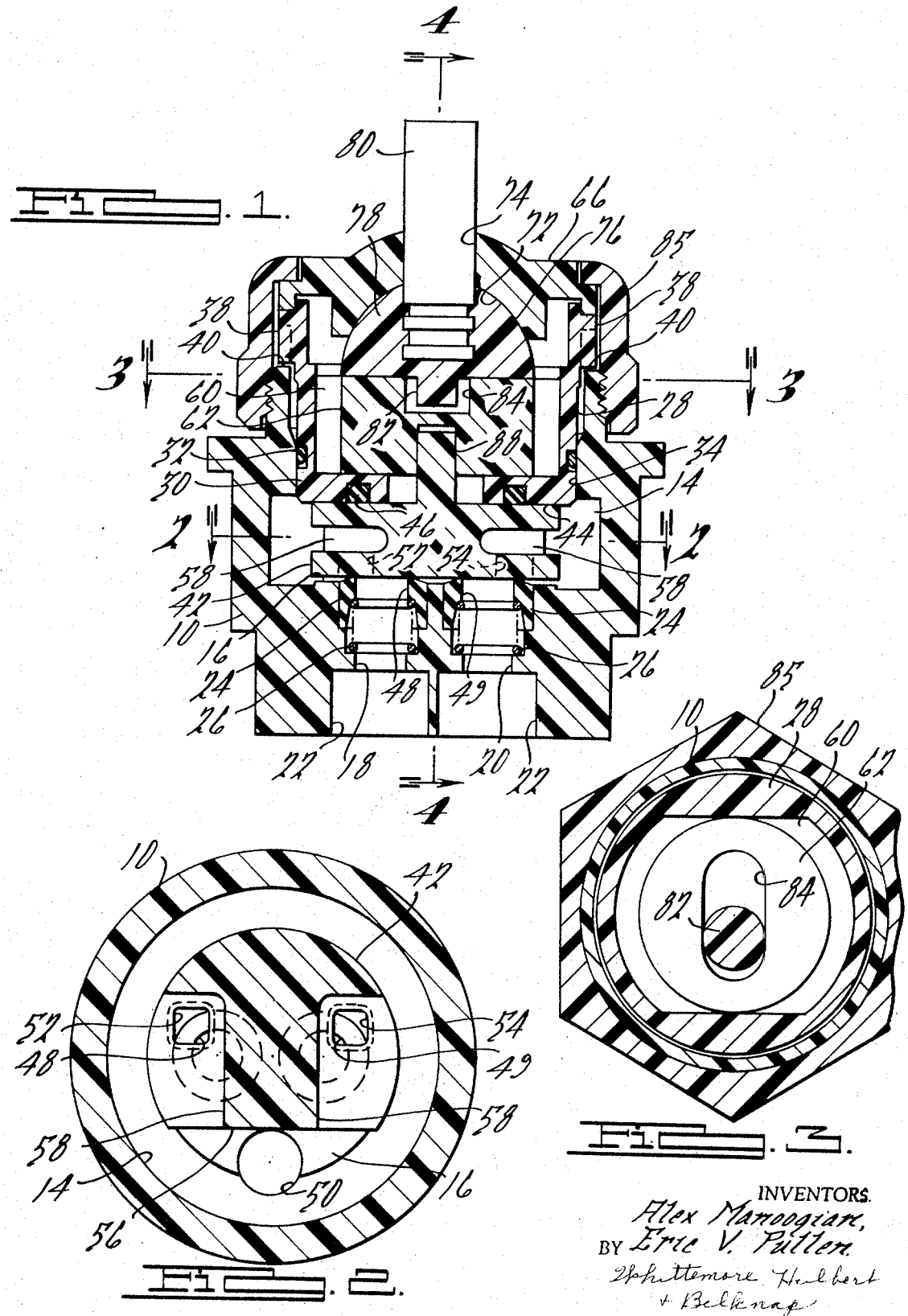

INVENTORS
Alex Manoogian,
BY Eric V. Pullen
Whittemore, Hulbert
& Belknap
ATTORNEYS

SINGLE HANDLE MIXING VALVE

In conventional disc type mixing valves the volume of flow is usually obtained by linear movement of the disc valve over the inlet ports while the mixture of the liquids is obtained by rotating the disc, and the maximum angle of rotation of the operating handle from full cold to full hot positions of the valve is generally so small as to make accurate temperature control rather difficult.

According to the present invention the volume of flow is regulated by linear forward and back movement of the disc valve, and the mixture is regulated by linear movement of the valve from side to side. The linear motion of the valve to control the mixture is obtained by the use of a control means between the operating handle and the disc valve, the construction of which is such that rotation of the operating handle on its axis causes linear movement of the valve disc to control the mixture. By the use of such control means the operating handle may be rotated through a full 180° even though the valve disc travels no greater distance than in conventional constructions, as the handle is rotated between its full cold to full hot positions, thus making the temperature variation much more gradual per degree of rotation than is possible with prior constructions. It is therefore much easier to obtain any desired temperature.

The disc valve of this invention also lends itself very readily to installations in which it is desired to supply faucets on opposite sides of a wall containing a single set of supply pipes without the necessity of any crossover piping to obtain the same direction of rotation of the operating handle in both faucets. In such installations it is necessary merely to reverse the position of the operating handle relative to the control element in one valve 180° from the position of the handle in the other valve.

In the drawings:

FIG. 1 is a vertical sectional view through a mixing valve constructed according to the present invention;

FIG. 2 is a fragmentary horizontal sectional view taken on line 2—2 of FIG. 1 and showing the valve disc in a partially open position and supplying equal amounts of hot and cold water;

FIG. 3 is a sectional view taken on line 3—3 of FIG. 1;

Figure 4:
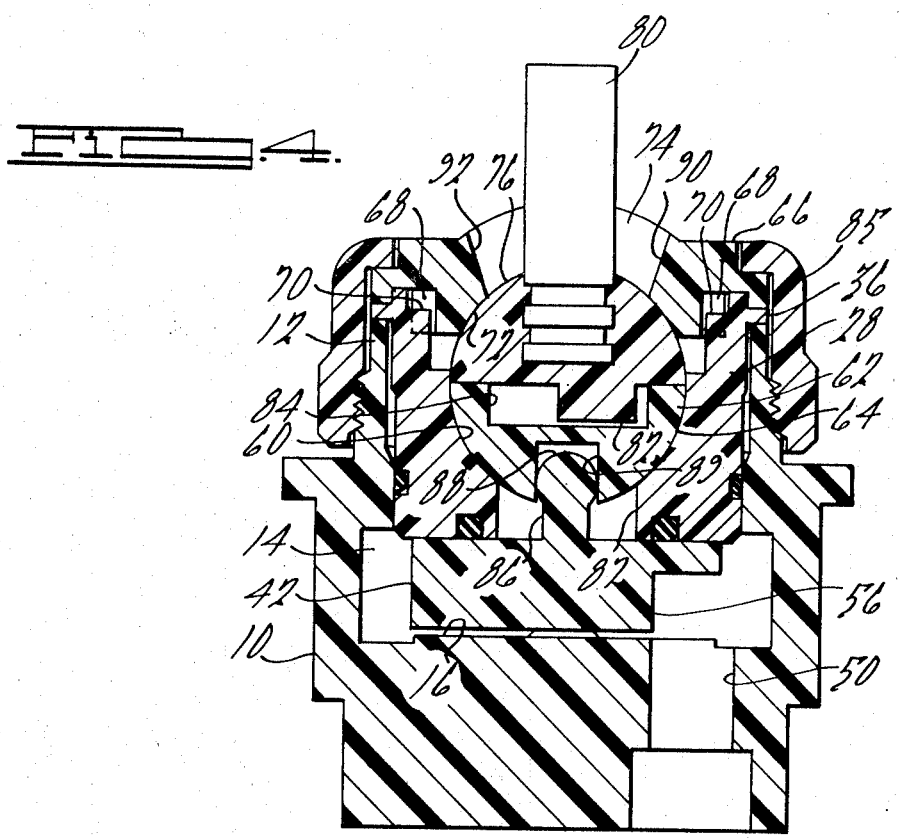
FIG. 4 is a sectional view taken on line 4—4 of FIG. 1.

The mixing valve includes a cylindrical valve body 10 having an exteranlly threaded upper end 12 and a cylindrical valve chamber 14 provided with a flat bottom wall 16. The lower end of the valve body 10 is provided with vertically extending passages 18 and 20 defining hot and cold water inlet passages which are counterbored as at 22 to receive hot and cold water supply pipes in a conventional manner. The passages 18 and 20 open into the bottom wall 16 of the valve chamber 14 and each is provided with a resilient valve seat member 24 and a spring 26.

A cylindrical retaining member 28 is mounted in the valve body 10 through the open upper end thereof and includes a cylindrical wall portion 30 having an annular groove adapted to receive an O-ring 32 which sealingly engages a reduced diameter portlon 34 formed on the valve body 10. At its upper end the retaining member 28 is provided with an outwardly extending flange 36 seated against the upper end 12 of the valve body and a pair of integral outwardly extending, diametrically opposed lugs 38 which are received in corresponding notches 40 formed on the upper end of the valve body 10 to lock the retaining member 28 in the proper angular position in the valve body 10.

A cylindrical disc valve 42 is disposed within the valve chamber 14 between the bottom wall 44 of the retaining member 28 and the bottom wall 16 of the valve chamber. An O-ring 46 in the bottom wall 44 of the retaining member 28 sealingly engages the upper surface of the disc valve 42, and the lower surface of the valve 42 sealingly engages and is slidable over the upper ends of the valve seat members 24 which have passages 48 and 49 therein which define the hot and cold water inlet ports of the valve. As shown in FIG. 2, the inlet ports 48 are symmetrically disposed on opposite sides of the axis of the valve chamber, and an outlet port 50 opens from the bottom wall 16 of the valve chamber and is adapted to be connected to a spout in a conventional manner.

The disc valve 42 has passages 52 and 54 opening from the bottom surface thereof which are adapted to be brought into and out of registry with the hot and cold water inlet ports 48 and 49 respectively. The lower part of the valve 42 is provided with a cut-out portion 56, and between the upper and lower surfaces thereof is provided with recesses 58 into which the upper ends of the passages 52 and 54 open so that water flowing through the passages 52 and 54 will be discharged through the recesses 58 into the valve chamber 14 for discharge through the outlet port 50.

The retaining member 28 has a cylindrical cavity 60 therein, the axis of which is parallel to a line joining the centers of the inlet ports 48 and 49. A control member 62 is movably mounted within the cavity 60. The control member has a flat upper surface and a cylindrical lower surface 64 which is seated in the clyindrical cavity 60 in the retaining member so that the control member 62 is rotatable on the horizontal axis of the cavity 60 which is parallel to the bottom wall 16 of the valve chamber. The diameter of the control member 62 is less than the length of the clyindrical cavity 60 so that the control member 62 is also slidable within the cavity 60 in the direction of the axis thereof.

A control cap 66 is mounted on the upper end of the retaining member 28 and on its under side has diametrically opposed notches 68 which receive corresponding inwardly extending projections 70 formed on the upper end of the retaining member 28 to maintain the control cap 66 in the proper angular orientation relative to the retaining member 28. The control cap has an elongated slot 74 therein and an operating member 76 is confined between the concave spherical surface 72 of cap 66 and the upper surface of the control megber 62. The operating member 76 includes a semispherical body portion 78 engaging against the spherical surface 72 of the control cap 66 and a stem 80 having its lower end embedded in the plastic material of which the body 78 is made and extending upwardly through slot 74 in the cap 66. The operating member 76 has a cam 82 which is offset from the axis of the stem 80 and extends downwardly into an elongated slot 84 formed in the upper surface of the control member 62. A clamping nut 85 is threaded onto body 10 and engages cap 66 to retain the parts in assembled relation.

The disc valve 42 has a projection 86 on its upper surface extending upwardly through an opening 87 in the bottom wall 44 of retaining member 28 and has a horizontally disposed cylindrical upper end 88 extending into a rectangular opening 89 in the control member 62. In this manner the disc valve 42 is connected to the operating member 76 through the control member 62, and movement of the control member 62 is constrained by the retaining member 28 to rotation on the axis of cavity 60 and to sliding movement along the length of the cavity.

The stem 80 may have a handle member secured thereto by means of which the stem 80 may be swung forward and backward through the slot 74 in the cap 66, and such motion of the spherical portion 78 of the operating member will effect corresponding rotation of the control member 62 on the axis of cavity 60. Upon such rotation the control member 62 will engage the end 87 of projection 86 to cause linear movement of the disc valve 42 over the inlet ports 48 and 49 in a direction normal to a line joining the centers of the ports 48 and 49. When the operating stem is swung toward the right as viewed in FIG. 4 until the stem engages the right-hand end 90 of the slot 74, the valve disc 42 will be moved toward the left as viewed in FIG. 4 and upwardly as viewed in FIG. 2, in which position the passages 52 and 54 therein are out of registry with the inlet ports 48 and 49. This is the closed position of the valve. When the stem 80 is swung to the position shown in FIG. 4, the passages 52 and 54 will have partial registration with their respective inlet ports 48 and 49, as shown in FIG. 2. When the stem 80 is swung to its other extreme position against the end 92 of the slot 74, the passages 52 and 54 will have maximum registration with their respective inlet ports 48 and 49, and this is the full flow position of the valve.

Figure 5:
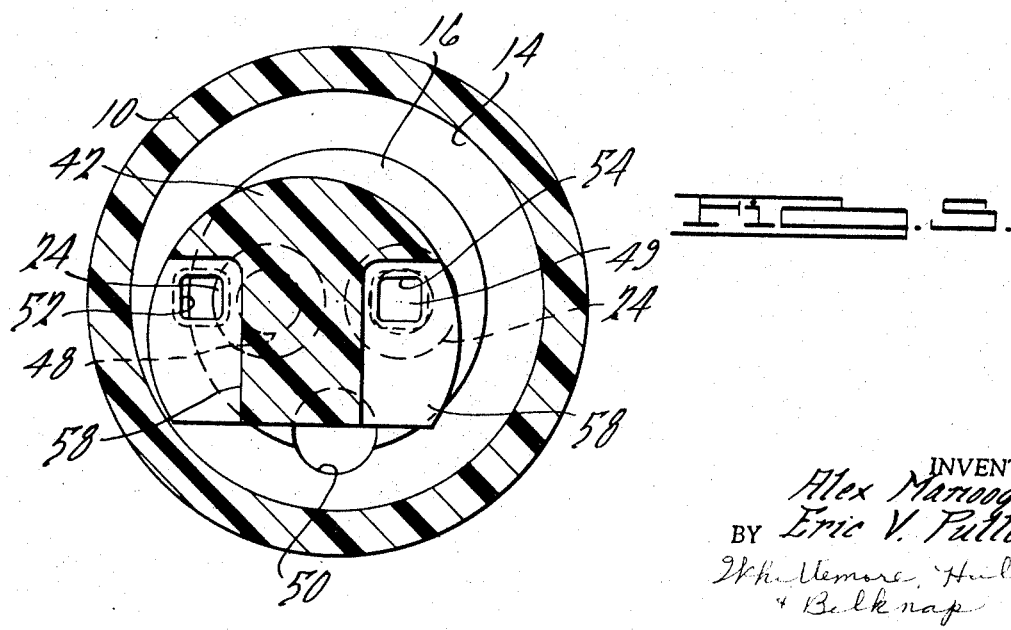
FIG. 5 is a view similar to FIG. 2, showing the valve disc positioned to supply cold water at full volume.

When the operating stem is rotated on its own axis, the eccentric cam 82 on the operating member 76 will cause the control member 62 to slide along the cylindrical cavity 60 in the retaining member 28 and such motion of the control member 62 will effect corresponding linear movement of the disc valve 42 in the same direction. Such motion of the disc valve 42 is from side to side as viewed in FIGS. 1, 2 and 5, and this motion of the disc valve is used to control the proportions of hot and cold water supplied through the valve. With the valve in an open position, rotation of the stem 80 in a clockwise direction to one limit position will effect registration of the passage 54 in the disc 42 with the cold water inlet port 49 while the hot water inlet port 48 is closed. In the other extreme rotative position of the operating stem 80 the passage 52 will have registration with its inlet port 48 while port 49 will be closed. The mixture of hot and cold water may be varied as desired with the operating stem set for any desired volume of flow, and the volume may be varied while maintaining the desired mixture.

The relationship of the eccentric 82 on the operating member 76 and the slot 84 in the control member 62 is such that the operating stem may be rotated on its own axis through 180° to effect linear movement of the disc valve 42 from the full cold to the full hot position thereof and vice versa. While the actual linear travel of the disc valve 42 is very slight, for example on the order of 5/16 inch, this amount of travel is accomplished by rotation of the operating stem 80 through 180° which results in a very accurate control of the temperature of the water passing through the valve.

In installations where it is desirable to install mixing valves on opposite sides of a wall containing a single set of supply pipes, it is also desirable to have both such valves operate in the same manner, that is, to be rotated in the same direction to open and close and to adjust the temperature of the mixture. With the valve of the present invention this is readily accomplished since it is merely necessary to assemble the operating member 76 and its eccentric cam 82 of the second valve in a position reversed 180° on its own axis relative to the control member 62. Thus it is not necessary to use any cross-over piping within the wall to obtain the same mode of operation of the two valves.

The length of the cylindrical cavity 60 may be such that the control member 16 will engage the ends of the cavity to limit rotation of the stem to just slightly less than 180° in either direction, or any other means to limit rotation of the stem may be employed. However, if desired, the parts may be proportioned so that the retaining member provides a slight obstruction or resistance to further rotation of the stem while still allowing such resistance to be overcome due to the inherent resilience of the materials so that the stem can be rotated beyond 180°. This latter construction would enable the user to select either direction of rotation from full cold to full hot position and would permit initial installation of two faucets in back-to-back relation in the manner described without the necessity of disassembly of either faucet.

What we claim as our invention is:

1. A mixing valve comprising a valve body having a valve chamber provided with a flat bottom wall, hot and cold water inlet ports opening into said bottom wall, and an outlet port opening from said valve chamber, a disc valve slidable over said bottom wall and having hot and cold water passages therethrough each of which is adapted to be brought into and out of registry with its respective inlet port, an operating member having a stem projecting outwardly from said valve body, said operating member being mounted in said valve body for swinging movement of said stem on an axis parallel to said bottom wall and for rotation on the axis of said stem, and control means in said valve body providing a motion transmitting connection between said operating member and said disc valve and operable upon swinging movement of said stem to effect linear movement of said disc valve in one direction to control the volume of flow therethrough, said control means being operable upon rotation of said stem on its axis to effect linear movement of said disc valve in a direction perpendicular to said one direction to control the mixture of the two liquids.

2. A mixing valve according to claim 1 wherein said control means permits rotation of said stem on its axis through substantially 180° to move said disc valve between full cold and full hot positions thereof.

3. A mixing valve according to claim 2 wherein said control means includes a control member having a connection with said operating member and with said disc valve, and a retaining member constraining said control member for rotation on said parallel axis upon swinging of said stem and for sliding movement along said axis upon rotation of said stem.

4. A mixing valve according to claim 3 wherein said retaining member has a semi-cylindrical cavity therein the axis of which is said parallel axis, said control member being seated in said cavity and having a flat upper surface, said surface having an elongated slot therein extending in a direction normal to said axis, said operating member having a flat undersurface engaging said surface of said control member and an eccentric cam projecting from said undersurface into said slot.

5. A mixing valve according to claim 4 wherein said operating member comprises a semispherical ball member, and a cap secured to said valve body and having a concave spherical surface engaging said ball member around said stem, said cap having an elongated slot therein through which said stem projects.

6. A mixing valve comprising a valve body having a vlave chamber provided with a flat bottom wall, hot and cold water inlet ports opening into said bottom wall, and an outlet port opening from said valve chamber, a disc valve slidable over said bottom wall and having hot and cold water passages therethrough each of which is adapted to be brought into and out of registry with its respective inlet port, and control means for said disc valve comprising an operating member including a stem projecting outwardly from said valve body, said operating member being mounted in said valve body for swinging movement of said stem on an axis parallel to said bottom wall and for rotation on the axis of said stem, a control member between said operating member and said disc valve and having a connection with the latter, a retaining member in said valve body, said control member being mounted on said retaining member and constrained thereby for rotation with said operating member on said parallel axis and for sliding movement in the direction of said axis, a cam on said operating member engageable with said control member and operable upon swinging movement of said stem to rotate said control member on said parallel axis thereby to effect linear movement of said disc valve in one direction to control the volume of flow therethrough, said cam being operable upon rotation of said stem on its axis to effect said sliding movement of said control member thereby to effect linear movement of said disc valve in a direction perpendicular to said one direction to control the mixture of the two liquids.

7. A mixing valve according to claim 6 wherein said retaining member has a clyindrical cavity therein and said control member has a cylindrical surface seated in said cavity, said retaining member having an opening therein, and means extending through said opening and providing said connection between said control member and said disc valve, and an annular seal between said retaining member and disc valve around said opening in said retaining member.

* * * * *